Ernest E. Seiler,
INVENTOR.

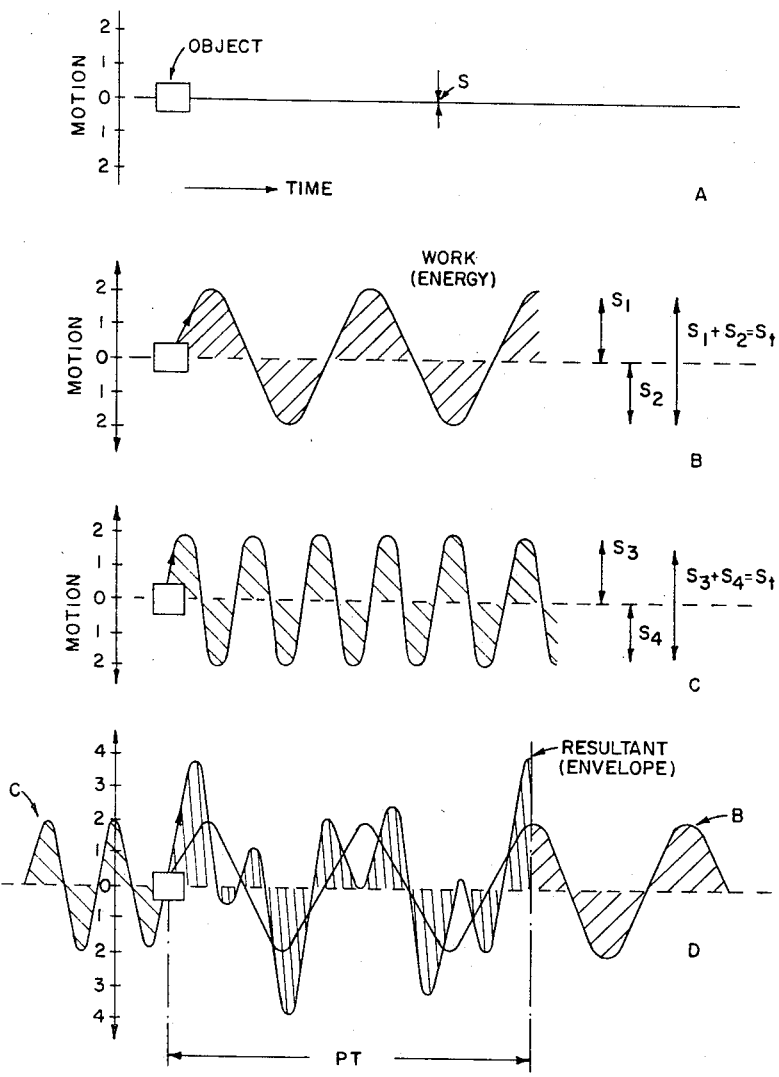

United States Patent Office 3,411,083
Patented Nov. 12, 1968

3,411,083
VIBRATION RECORD ANALYZER
Ernest E. Seiler, Madison, Ala., assignor to the United States of America as represented by the Secretary of the Army
Filed Feb. 1, 1966, Ser. No. 524,359
8 Claims. (Cl. 324—77)

The invention described herein may be manufactured and used by or for the Government for governmental purposes without the payment of any royalty thereon.

This invention relates generally to a device for analyzing vibration records and more specifically this invention relates to a device for analyzing vibration records by subtracting individually recognized (detected) components which, in their sum, make up the recorded mode of vibration.

The analysis of a complex vibration characteristic that is recorded during missile flight or other vehicle test should reveal its components such as, individual frequencies and amplitudes (accelerations), which make up the final mode of vibration.

An analysis is normally made by applying the Fourier Analysis (Harmonic Analysis) by determining harmonics, and mathematically evaluating the concealed qualities. The cost of the required and complex equipment, and their operation and maintenance is expensive, and the process is time consuming. Also, another disadvantage of the Fourier Analysis is that the initial record, or the sum of all concealed frequencies and amplitudes, is used throughout the analysis. This summary characteristic is complex and hides its individual components which, therefore, are hardly detectable by electronic or electro-mechanical equipment. Although the validity of the Fourier Analysis is not questioned, there is a need for a routine-like analysis of vibration records from flight and laboratory tests.

It is therefore an object of this invention to provide a device for a more practical scientific analysis of vibration records rather than the laborious Fourier Analysis.

Another object of this invention is to provide a device which will reveal the individual components of the sum of a vibration record, clearly separated.

Another object of this invention is to provide a device which will provide the above objects in a more simple and faster manner.

Other objects and many of the attendant advantages of this invention will be readily appreciated as the same becomes better understood by reference to the following detailed description when considered in connection with the accompanying drawings wherein:

FIGURE 2 is a graphical representation of an analyzed vibration record.

Figure 1:
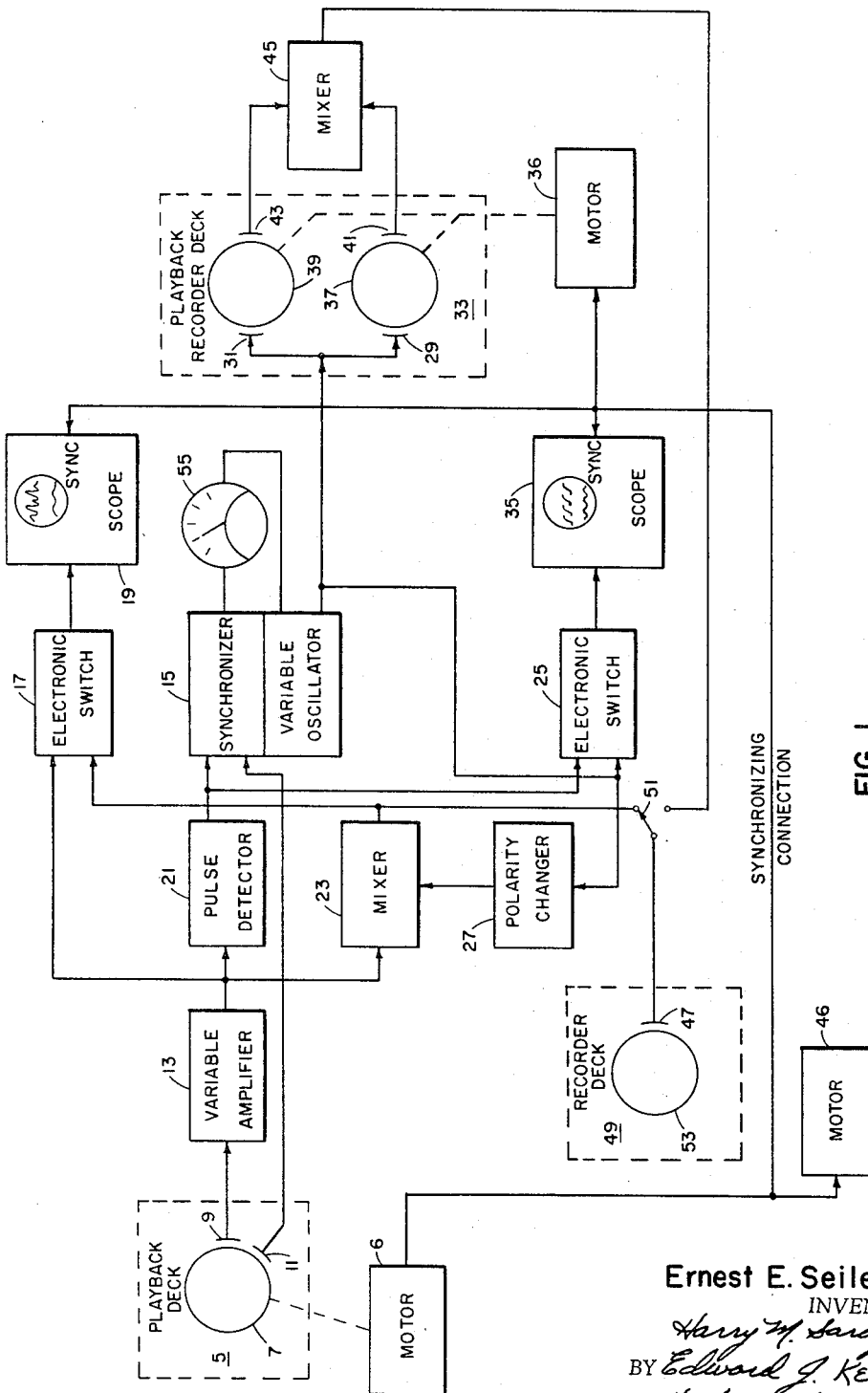
FIGURE 1 is a block diagram according to the present invention.

Referring now to FIGURE 2, for a simple explanation of the principle involved, which shows that an object which is not excited by a force will remain in its motionless condition, or will not change its motion throughout any length of time. FIGURE 2 Graph A shows an object where the motion is zero, that is, its displacement or swing "S" is equal to zero.

Graph B of FIGURE 2 shows an excited object in motion, swinging at a certain frequency and amplitude, deviating from zero. This swinging object conceals "work" (energy) expressed by the number of cycles per second, its mass, and the amplitude. The amplitude is the deviation from zero, so both the positive "S1" and negative "S2" result in a total swing of "S1" plus "S2," equal to "ST."

A similar motion or swing, but at a higher frequency, is shown in Graph C of FIGURE 2. If the appropriate amount (amplitude and frequency) of the concealed "work" (energy) were subtracted from the object in motion as shown in Graphs B and C, the object would become motionless as shown in Graph A.

Subtracting an insufficient amount of energy, or too much energy, would leave the object partially in motion, or would "excite" it at the same frequency but in an opposite direction, or changed polarity of motion.

An object may be excited simultaneously by two different forces or modes of vibration, such as by those shown in Graphs B and C. The resultant is shown in Graph D of FIGURE 2. In this graph, the object which is excited simultaneously by forces B and C the period of time "PT" executes a motion which is equal to the sum of the forces. The motion is indicated by the resultant, which is the envelope of the sum of the concealed forces.

If force B were subtracted, the remainder would be force C, further subtraction of force C would leave the object motionless, as shown in Graph A. Re-injection of subtracted forces B and C would result in a motion of the object as shown in Graph D, period "PT," provided that the subtracted forces (components) B and C were properly phased, and of the proper quantity and quality, i.e., of proper frequency and amplitude.

A particular device for application of this principle of vibration record analysis will now be discussed with reference to FIGURE 1, wherein a recording playback deck 5 having a recording reel 7, upon which a sample vibration recording on magnetic tape is placed, two magnetic pickup heads 9 and 11, and a motor 6 for driving reel 7 is connected thru pickup 9 to a variable amplifier 13 while pickup 11 is connected to a first input of a combined synchronizer and variable oscillator 15. The output of amplifier 13 is connected to a first input of a first electronic switch 17 whose output is connected to a first oscillscope 19 for display thereon of the signal taken from reel 7. The output of amplifier 13 is also connected commonly to the inputs of a pulse detector 21 and a first mixer 23. The output of pulse detector 21 is connected commonly to a second input of synchronizer and variable oscillator 15 and a first input of a second electronic switch 25. The output of synchronizer and variable oscillator 15 is connected commonly to a second input of electronic switch 25, an input of polarity changer 27 and recording heads 29 and 31 of playback recorder 33. The output of electronic switch 25 is connected to a second oscilloscope 35 which displays the output of pulse detector 21 along with the output of synchronizer and oscillator 15. Playback recorder 33, along with recording heads 29 and 31, contains recording reels 37 and 39 for receiving strips of magnetic recording tape with associated magnetic playback heads 41 and 43 respectively and a motor 36 for rotating reels 37 and 39. The outputs of heads 41 and 43 are connected to separate inputs of a second mixer 45. The output of mixer 45 is connected to a magnetic recording head 47 of recorder 49 through a manual switch 51. The output of mixer 23 is also connected through switch 51 to recording head 47. Recorder 49 has a recording reel 53 for receiving strips of magnetic tape which records the output of mixer 23 or mixer 45 depending upon which is selected by switch 51 and a motor 46 for rotating reel 53.

Motors 36 and 46 and oscilloscopes 19 and 35 are synchronized with respect to an output of motor 6 by means of synchronizing connection 56.

The operation is as follows:

A suitable part of a vibration record to be analyzed is attached to reel 7 for the purpose of repeatedly being played back, as required to subtract the first visual force. The signal is picked up by head 9 and amplified by amplifier 13, then displayed on scope 19 after passing through electronic switch 17.

This signal is also fed into pulse detector 21 which detects only the rising branches (slopes) of the signal. The pulses representing rising branches are fed to scope 35 through electronic switch 25. Pulses from detector 21 are also fed into the oscillator portion of the synchronizer and oscillator 15 and the output of the oscillator is fed to scope 35 through electronic switch 25. A galvanometer 55 is connected to the synchronizer and variable oscillator 15, so that when the oscillator frequency is properly tuned to the pulses, the galvanometer 55 will show the highest deflection and scope 35 will show whether or not the selected frequency is in harmony with the number of pulses. The output of oscillator 15 is also fed to mixer 23 through polarity changer 27 where mixer 23 subtracts the selected signal from the input signal and the resultant (output of mixer 23) is displayed on scope 19 for comparison with the initial input signal, determination of proper amplitude of the subtracted signal and, if required, for final correction and matching of the selected frequency.

If the selected amplitude and frequency appear to be correct, the playback recorder 33 is activated to record the subtracted signal on reel 31 and the resultant displayed on scope 19 is recorded on reel 53 (with switch 51 in the position shown in FIGURE 1). Reel 7 is then set aside, reel 53 is placed on playback deck 5 and the same procedure is repeated for subtracting the next visible frequency and amplitude. The second force may be recorded on reel 29. Upon subtraction of approximately 80 percent of the visual and recognizable forces, amplifier 13 is set to amplify the signal from reel 7 by a factor of five and repeat the subtracting of the next visible frequency and amplitude as described above. Continuing this procedure, amplifying the remainder in increments and subtracting the visible signals, the final remainder is of negligible quantity.

In practice, an amplification of up to magnitudes of 100 would be possible wherein the remainder would be approximately 20 percent of the magnitude or an equivalent of approximately 0.2 percent of the sum of the forces initially recorded. These remaining forces which are non-sinusoidal of relatively low frequency, or damped resonance vibrations can be analyzed manually or, if necessary, automatically by using signal generators which produce these types of signal, or by attaching several strips (portions of the recorded tape) together for determining relatively low frequencies. After the individual forces are subtracted from the initial recording, they may be combined in any desired manner by combining recordings on reels 39 and 37 through mixed 45 and recorded on reel 53 switch 51 set accordingly.

As stated above, reel 7 carries a suitable part of the vibration record to be analyzed and the so-selected part would not start with each turn in proper accord with the signal produced by synchronizer and oscillator 15. Thus, the synchronizer must receive an advance signal which is placed on reel 7.

When the record to be analyzed has such a high density of recorded vibrations that rising branches are not detectable or the frequency of the vibration is so low that the operator can not recognize the frequency he should subtract, there is an additional feature of this vibration analyzer which allows the operator to stretch the record in the first case and compress the record in the second case. Thus, it is of great help to the operator when recorder 49 (reel 53) is rotated in various adjustable ratios with respect to reels 37 and 39 of playback recorder 33. Stretching a record requires that reel 53 turn two, three, or four times as fast as reels 37 and 39. To condense a record or add several records (one after another) on one reel, it would require that reel 53 turn two, three or four times as slow as reels 37 and 39 turn. This is accomplished by speed adjustments on motor 46 which is not shown. The proper synchronization of scopes with reels is accomplished by either an electrical connection as shown or mechanical means.

It is therefore obvious that the method of analyzing a complex vibration record is carried out by the above disclosed invention which subtracts single forces determined individually until all of the forces which make up the complex vibration record are subtracted.

While the invention has been described with reference to a preferred embodiment thereof, it will be apparent that various modifications and other embodiments thereof will occur to those skilled in the art in light of the instant disclosure. Accordingly, it is desired that the scope of this invention be limited only by the appended claims.

What is claimed is:

1. A vibration record analyzer comprising: a playback deck for playing back a vibration record sample which is to be analyzed, said playback deck having a first and a second output; an amplifier having an input connected to said first output of said playback deck; a detector having an input connected to an output of said amplifier; a first switch having a first and second input and an output, said first input being connected to said output of said amplifier; a first mixer having a first input connected to said output of said amplifier and an output connected to said second input of said first switch; a first oscilloscope connected to said output of said first switch for displaying alternately said vibration sample and a signal output of said first mixer; a synchronizer and variable oscillator having a first and second input and an output, said first input being connected to an output of said detector, said second input being connected to said second output of said playback deck; a playback recorder having an input and a first and second output, said input being connected to said output of said synchronizer and variable oscillator; a polarity changer connected between said output of said synchronizer and variable oscillator and a second input of said first mixer; a second switch having a first and second input and an output, said first input of said second switch being connected to said output of said detector, said second input of said switch being connected to said output of said synchronizer and variable oscillator; a second oscilloscope connected to said output of said second switch for displaying alternately signal outputs of said detector and said synchronizer and variable oscillator; a second mixer having a first and second input and an output, said first and second inputs being connected respectively to said first and second outputs of said playback recorder; a recorder connected to said output of said second mixer through one position of the contacts of a manual switch, said recorder being alternately connected to said output of said first mixer through a second position of the contacts of said manual switch, whereby a difference signal representing the difference of said sample signal and a signal generated by said variable oscillator which represents one force present in said vibration record which is being analyzed.

2. A vibration record analyzer as set forth in claim 1 wherein said playback deck comprises a reel for receiving a sample tape of said vibration record, a first and a second magnetic pickup head connected respectively to said first and second outputs of said pickup means, and a motor for rotating said reel.

3. A vibration record analyzer as set forth in claim 1 wherein said recorder means comprises a reel for receiving a recording tape, a magnetic recording head connected to said input of said recorder means, and a motor for rotating said reel.

4. A vibration record analyzer as set forth in claim 3 wherein said playback recorder means comprises a pair of reels for receiving recording tapes; each of said reels having an associated recording and pickup heads; and a motor for rotating said pair of reels.

5. A vibration record analyzer as set forth in claim 4 further comprising synchronizing means connected between said motor of said playback deck and each of said other motors and oscilloscopes for synchronizing said motors and oscilloscopes.

6. A vibration record analyzer as set forth in claim 1 wherein said first and second switches are electronic switches.

7. A vibration record analyzer as set forth in claim 1 wherein said detector comprises a pulse detector for detecting rising branches of said vibration sample whereby said variable oscillator means can be varied to correspond with the frequency of rising branches detected by said detector means.

8. A vibration record analyzer as set forth in claim 1 further comprising a galvanometer connected between said synchronizer and said oscillator for indicating proper tuning of said oscillator with respect to output pulses from said pulse detector.

References Cited

UNITED STATES PATENTS 3,015,949   1/1962   Arnold _____ 324—77 X

RUDOLPH V. ROLINEC, *Primary Examiner.*

P. F. WILLE, *Assistant Examiner.*